May 23, 1944.   R. G. WILLARD ET AL   2,349,325
AIRCRAFT SELECTOR
Filed Dec. 28, 1942   2 Sheets-Sheet 1
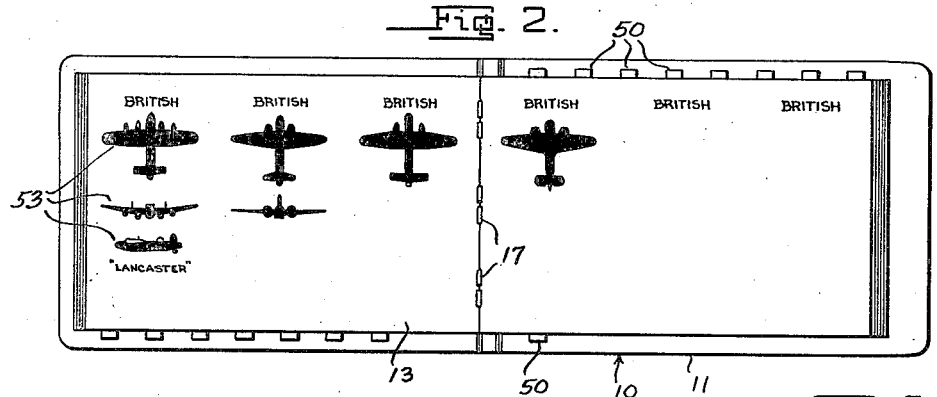
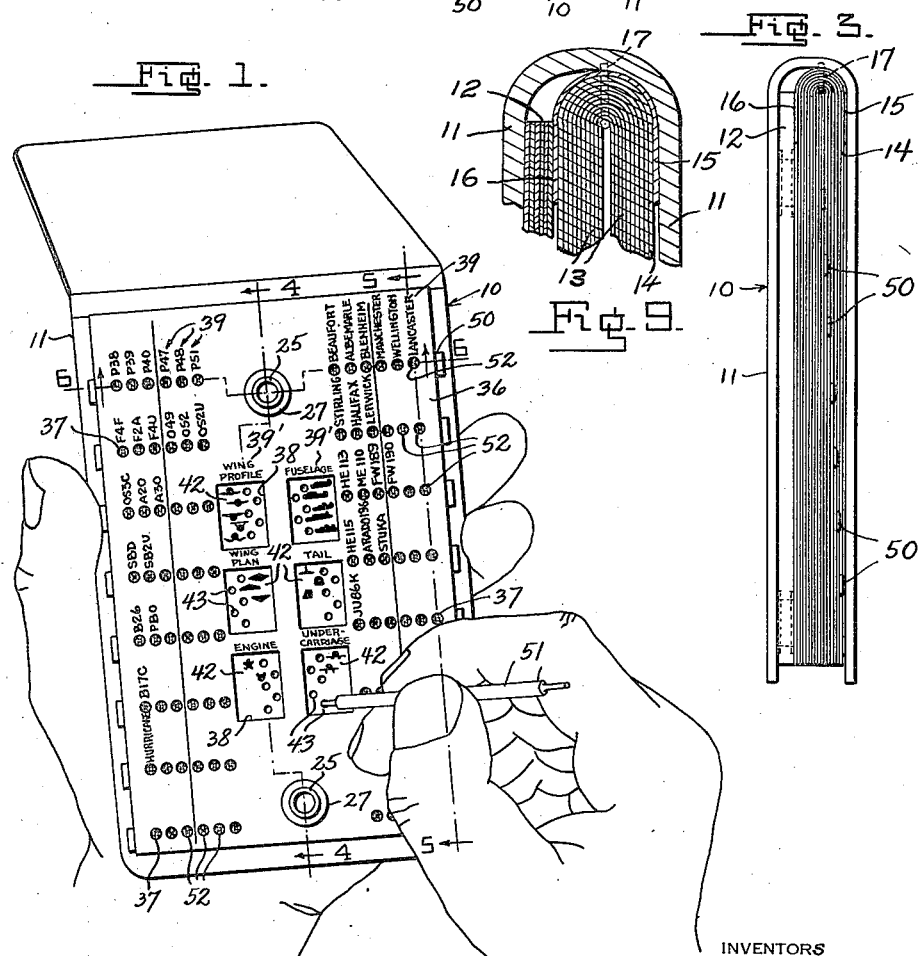
INVENTORS
Robert G. Willard
William H. Van Benschoten
BY
ATTORNEY May 23, 1944.　　　R. G. WILLARD ET AL　　　2,349,325
AIRCRAFT SELECTOR
Filed Dec. 28, 1942　　　2 Sheets-Sheet 2
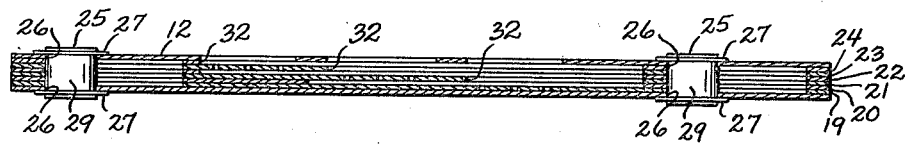
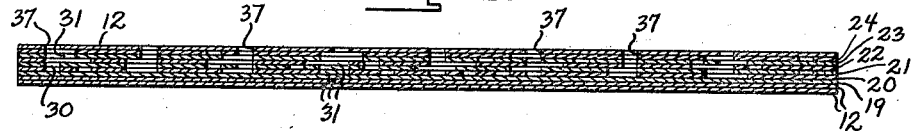
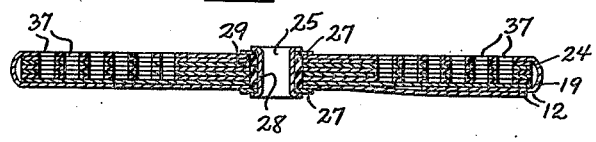
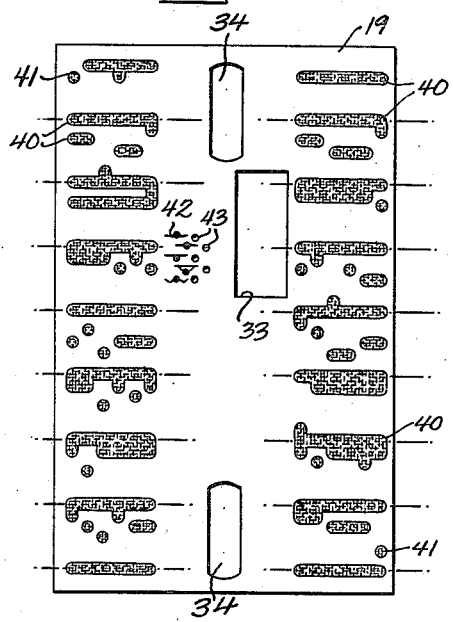
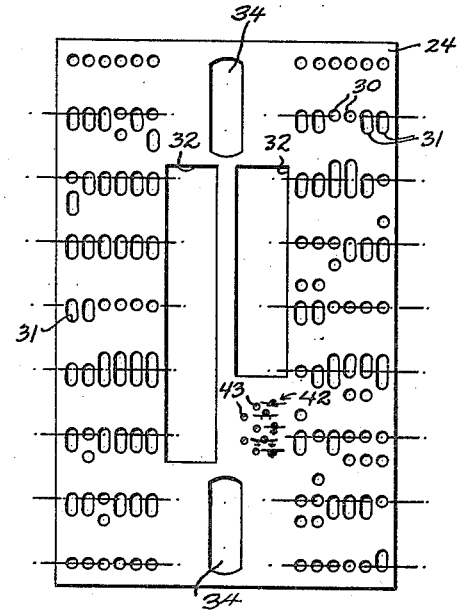
INVENTORS
Robert G. Willard
William H. Van Benschoten
BY
ATTORNEY Patented May 23, 1944

2,349,325

UNITED STATES PATENT OFFICE 2,349,325

AIRCRAFT SELECTOR

Robert G. Willard and William H. Van Benschoten, United States Navy

Application December 28, 1942, Serial No. 470,415

8 Claims. (Cl. 35—1)

(Granted under the act of March 3, 1883, as amended April 30, 1928; 370 O. G. 757)

The present invention relates to an aircraft selector.

At the present time there are many types of aircraft produced by the respective nations. The various nations have trained personnel known as spotters. Some of the aircraft designs of one nation will closely simulate the designs of another, or other nations and, therefore, it is difficult for the spotters to keep in mind the characteristics of all aircraft. Due to the close simulation in design, it is difficult at a glance, to determine to what nation a particular aircraft belongs.

It is, therefore, an object of the present invention to provide a device provided with means that will positively identify an aircraft from its general outlines.

Another object of the present invention is the provision of a device provided with means for identifying aircraft from a selected portion of an aircraft.

A still further object of the present invention is the provision of a device provided with means for identifying an aircraft from a plurality of selected portions of an aircraft.

A still further object of the present invention is the provision of an aircraft selector having a plurality of sheets adapted for sliding movement.

With these and other objects in view, the invention consists in the combination and arrangement of parts to be hereinafter described and claimed, reference being had to the accompanying drawings in which the numerals of reference designate similar parts in the several views and wherein:

Figure 1 is a perspective view of the selector illustrating the housing portion in which are housed a plurality of sheets, and the method of using this portion of the device.

Figure 2 is a plan view of another portion of the selector and illustrating some of the sheets hingedly mounted to a cover, indicia on the the sheets, and tabs carried by the sheets.

Figure 3 is an end elevational view of the device illustrating the selector and the plurality of sheets with tabs, housed in a cover.

Figure 4 is a sectional view of the housing portion of the device taken on line 4—4 of Figure 1, illustrating the means securing the plurality of sheets in the housing, and the variations in the slots in the respective sheets.

Figure 5 is a sectional view of the housing portion of the device taken on line 5—5 of Figure 1 looking in the direction of the arrows and illustrating the position of the apertures in the sheets with those in top face of the housing and the variation in the sizes of some of the slots.

Figure 6 is a transverse sectional view taken on line 6—6 of Figure 1, looking in the direction of the arrows and illustrating the position of the apertures in the sheets with those in the top wall of the housing.

Figure 7 is a top plan view of the bottom sheet in the housing and illustrating the configuration of the colored portions thereon, and slots and an elongated opening in the sheet.

Figure 8 is a top plan view of one of the sheets in the housing and illustrating the various apertures, slots and elongated openings therein.

Figure 9 is an enlarged fragmentary view illustrating the fabric hingedly connecting the housing and the book.

Referring to the drawings, the numeral 10 represents the device and it comprises a cover 11, a housing 12 and a plurality of sheets 13. The housing 12 and the plurality of sheets 13 are hingedly connected to the cover 11 by any suitable material, and in the present showing, the bottom sheet 14 has a portion of fabric 15 secured thereto, the other portion of the fabric 15 being secured to the housing 12 at 16. The plurality of sheets 11 are connected to the cover by hinges 17.

Within the housing 12 are a plurality of sheets 19, 20, 21, 22, 23 and 24 of any suitable material and as illustrated in Figures 4, 5 and 6 of the drawings, these sheets are provided with elongated slots 34 and are held for sliding movement in the housing by rivets 25 that pass through apertures 26 in the housing 12, the rivets being provided with flanged members 27 that impinge the tip and bottom walls of the housing 12. The outer peripheral wall 28 of the rivets 25 are provided with a resilient rubber covering 29 for a purpose to be later described. Each one of the sheets in the housing 12, with the exception of the bottom sheet 19 is provided with apertures 30, slots 31 of various sizes and elongated openings 32 of various sizes, sheet 19 having an elongated opening 33. In Figure 8, sheet 24 is illustrated and this sheet shows the various sizes of the slots 31 and the elongated openings 32. The elongated openings 35 are of a predetermined width but the longitudinal length in each sheet varies.

The wall 36 of the housing 12 is provided with a plurality of apertures 37 that are in spaced relation both horizontally and vertically, and a plurality of windows 38 of uniform size in spaced relation with respect to each other and to the ends and sides of the body 12, the windows 38 being approximately midway of the wall 36. As shown in Figure 6 of the drawings, the apertures 37 are in transverse alignment with the apertures 30 and slots 31 of the sheets 20, 21, 22, 23 and 24 in the housing 12. Adjacent each of the apertures 37 in the housing 12 are indicia 39 of various designations such as letters, numerals and names and adjacent the top portions of the windows 38 there are provided the names of different parts of an airplane 39'.

In Figure 7 the bottom sheet 19 in the housing 12 is illustrated and it is provided with a plurality of colored portions 40 that are in spaced relation some of the portions being of uniform configuration, the others of irregular configuration, a plurality of dots 41 and the opening 33. Sheet 19 is further provided with indicia 42 in staggered relation and a plurality of holes 43 adjacent the indicia 42 in staggered relation.

Secured to the pages 13 are tabs 50 which align with the rows of apertures 37 in the face 36 of the housing 12. These tabs facilitate opening of the booklet to the page 13 that contains data relating to the subject matter of the indicia 39 adjacent the apertures 37.

In use, the selector is held in the palm of one hand, as illustrated in Figure 1. The operator inserts a suitable stylus 51 in the hole 43 opposite a known characteristic of the aircraft being observed, as represented by the indicia 42, and pulls down until the stylus engages the lower edge of the housing window which frames the characteristic. Thus, the sheet relating to that group of characteristics which includes the known characteristic is shifted relative to the face of the housing 12, the adjacent sheets tending to remain stationary due to engagement of the rubber sleeve 29 therewith. In the case of the bottom sheet 19 shown in Figure 7, the contrastingly colored areas 40, 41 thereof are shifted relative to the sight apertures 37 in the face of the housing 12. In the case of the remaining sheets, including the top sheet 24 shown in Figure 8, the perforations 30, 31 therein are shifted relative to the sight apertures 37 in the face of the housing 12. In either case, the circular contrastingly colored dots 52 initially visible through all the sight apertures in the face of the housing 12, as illustrated in Figure 1, will remain visible only opposite the names of aircraft having the known characteristic.

As more characteristics of the aircraft are drawn into display position, additional sheets are displaced relative to the apertures in the face of the housing 12, so that more of the circular contrastingly colored dots 52 will be masked until but one or a few remain visible. The name or names of the indicated aircraft are then read opposite the colored dot or dots which remain visible. The booklet may then be opened to the page 13 which contains silhouettes 53 of the indicated aircraft by using the tab 50 in alignment with the colored dot. The silhouettes 53 are located in the position corresponding to that of the name in the group of six on the face 36 of the selector. For example, should the colored dot 52 remain visible through the sight aperture at the upper right hand corner of the selector face, a "Lancaster" airplane is indicated. By using the tab 50 aligning with the "Lancaster" dot, the booklet is opened to the page 13 illustrated in Figure 2 and the "Lancaster" silhouettes 53 are seen in the first column of the open booklet.

It will, of course, be understood that the invention is not restricted to use in the identification of airplanes, but may be employed equally as well to discriminate between other equipment, such as warships, which have varying combinations of identifying characteristics.

Various changes may be made in the form of invention herein shown and described, without departing from the spirit of the invention or the scope of the following claims.

The invention described herein may be manufactured and used by or for the Government of the United States of America for governmental purposes without the payment of any royalties thereon or therefor.

What is claimed is:

1. In combination, an identification device comprising a cover, a selector and a book, said selector and book hingedly mounted independently of each other in said cover, said selector comprising a plurality of normally visible zones, each appropriately designated to represent a different make or model of equipment to be identified, selectively operable shielding members in said selector, each being adapted for eliminating different groups of said zones from view, said book having pages each containing data relating to at least one make or model of said equipment, each page provided with an index tab aligning with the zone selected representing the make or model of equipment corresponding to the data on said page.

2. In combination, an identification device comprising a cover, a selector and a book, said selector and book hingedly mounted independently of each other in said cover, said selector provided with an indicating sheet, a masking sheet provided with a plurality of sight openings for viewing the indicating sheet, a plurality of shielding sheets between the masking and indicating sheet and provided with perforations for viewing the indicating sheet, said shielding sheets being slidable relative to the masking sheet for obscuring the indicating sheet from view through different groups of said sight openings whereby selected portions of said indicating sheet may be viewed through said perforations, the pages of said book provided with index tabs aligned with said openings in said masking sheet period.

3. In a device of the character described, a cover, a book and a housing hingedly mounted in said cover having a face plate and a back plate, said plates provided with aligning openings, a plurality of sheets slidably disposed between said plates and provided with aligning elongated slots, a post extending through said openings and slots, a resilient sleeve encircling said post adapted for engagement with the walls of said slots, whereby said sheets are retained against casual displacement in said housing, the pages of said book provided with index tabs aligned with said openings in said face plate period.

4. In a device of the character described, a cover, a housing hingedly mounted in said cover provided with a face plate, a plurality of windows in said face plate, a plurality of sheets in said housing and slidable behind said face plate, said slidable sheets provided with slots extending in the direction of sliding movement of said sheets and of a size to expose a portion of each of said sheets to a different one of said face plate windows, apertures in the exposed portions of said slidable sheets adapted to receive the point of a stylus whereby any of said sheets may be slidably adjusted relative to the face plate.

5. In combination, an identification device comprising a cover, a book and a housing hingedly mounted in said cover, a masking sheet provided with a plurality of sight openings, a selector sheet disposed behind said masking sheet and slidable relative thereto, said selector sheet provided with a plurality of perforations arranged to form continuations of all of said sight openings when the selector sheet is disposed in a given position relative to the masking sheet, said perforations forming continuations only of different groups of said sight openings when the selector sheet is slid to positions differently spaced from said given position, the pages of said book provided with index tabs aligned with the sight openings in said masking sheet.

6. In combination, an identification device comprising a cover, a book and a housing hingedly mounted in said cover, a masking sheet provided with a plurality of sight openings, a selector sheet disposed behind the masking sheet and slidable relative thereto, said selector sheet having a main surface area and a plurality of areas contrasting in color to said main surface area, said contrasting areas on the selector sheet visible through all of said sight openings when the selector sheet is disposed in a given position relative to the masking sheet and so that said contrasting color is visible only through different groups of said sight openings when the selector sheet is slid to positions differently spaced from said given position, the pages of said book provided with index tabs aligned with the sight openings in said masking sheet.

7. In combination, an identification device comprising a cover, a book and a housing hingedly mounted in said cover, a masking sheet provided with a plurality of sight openings, a plurality of selector sheets disposed behind the masking sheet and each provided with a plurality of perforations forming continuations of said sight openings when said selector sheets are disposed in a given position relative to the masking sheet, the perforations in any given selector sheet forming continuations of a group of sight openings when said given sheet is slid to a position spaced from said given position, and an additional selector sheet disposed behind said plurality of selector sheets, said additional selector sheet having a main surface area and a plurality of areas contrasting in color to said main surface area, said contrasting areas being normally visible through any given one of said sight openings when said additional selector sheet is disposed in a given position relative to the masking sheet, and when the perforations of said plurality of selector sheets form a continuation of said given sight opening, said contrasting color being visible through any selected sight opening of a group of sight openings when the perforations of said plurality of selector sheets form a continuation of said selected sight opening and when said additional selector sheet is slid to a position spaced from said given position, the pages of said book provided with index tabs aligned with the sight openings in said masking sheet.

8. In combination, an identification device comprising a cover, a book and a housing hingedly mounted in said cover, the front face of said housing provided with a plurality of windows and a plurality of perforations in spaced relation horizontally and vertically, selector sheets in said housing and slidable therein, each of said selector sheets provided with a plurality of perforations and windows forming sight openings, said selector sheets slidable in said housing, said perforations and windows in said selector sheets forming continuations of all sight openings when a selector sheet is disposed in a given position relative to the front face so that said perforations form continuations only of different groups of said sight opening when the selector sheet is slid to positions differently spaced from said given position, the pages of said book provided with index tabs aligned with the perforations in the front face of said housing.

ROBERT G. WILLARD.
WILLIAM H. VAN BENSCHOTEN.